United States Patent
Mino

(10) Patent No.: US 8,605,460 B2
(45) Date of Patent: Dec. 10, 2013

(54) METHOD FOR STARTING UP DC-DC CONVERTER

(75) Inventor: Kazuaki Mino, Hino (JP)

(73) Assignee: Fuji Electric Co., Ltd. (JP)

( * ) Notice: Subject to any disclaimer, the term of this patent is extended or adjusted under 35 U.S.C. 154(b) by 324 days.

(21) Appl. No.: 13/019,767

(22) Filed: Feb. 2, 2011

(65) Prior Publication Data

US 2011/0188275 A1    Aug. 4, 2011

(30) Foreign Application Priority Data

Feb. 3, 2010  (JP) ................................ 2010-022077

(51) Int. Cl.
  *H02M 3/335*    (2006.01)
(52) U.S. Cl.
  USPC ........................................... 363/17; 219/130
(58) Field of Classification Search
  USPC ......... 363/16–20, 21.02, 21.08, 21.15, 21.18, 363/25–26, 56.12, 39, 98, 132; 323/222, 323/224, 225, 282–285; 315/219, 247
  See application file for complete search history.

(56) References Cited

U.S. PATENT DOCUMENTS

| 5,406,051 | A | * | 4/1995 | Lai | 219/130.1 |
| 5,781,419 | A | * | 7/1998 | Kutkut et al. | 363/17 |
| 5,956,238 | A | * | 9/1999 | Wunderlich | 363/17 |
| 6,856,521 | B1 | * | 2/2005 | Chen et al. | 363/17 |
| 6,995,987 | B2 | * | 2/2006 | Song et al. | 363/17 |
| 2009/0018011 | A1 | | 1/2009 | Birbara et al. | |
| 2010/0220500 | A1 | | 9/2010 | Mino et al. | |

FOREIGN PATENT DOCUMENTS

| JP | 2009-018302 A | 1/2009 |
| JP | 2010-178501 A | 8/2010 |

* cited by examiner

*Primary Examiner* — Rajnikant Patel

(74) *Attorney, Agent, or Firm* — Rossi, Kimms & McDowell LLP

(57) ABSTRACT

Aspects of the invention provide a method for starting up a DC-DC converter by which an output voltage can be prevented from overshooting and body diodes of switching devices can be prevented from reverse recovery. In the start-up method, the phases of gate signals of third and fourth switching devices are gradually shifted relative to the phases of gate signals of first and second switching devices. With increase of the phase shift, a voltage on a primary side of a transformer is also increased, and an output voltage is also increased.

3 Claims, 7 Drawing Sheets

METHOD FOR STARTING UP DC-DC CONVERTER

BACKGROUND OF THE INVENTION

1. Field of the Invention

The present invention relates to a method for stating up an insulated DC-DC converter which has a full-bridge configuration on a primary side of a transformer.

2. Description of Related Art

FIG. 9 shows an example of a DC-DC converter disclosed in Japanese Patent Application No. 2009-18302.

The DC-DC converter in FIG. 9 has a full-bridge configuration on a primary side of a transformer 9. MOSFETs are used as switching devices 1 to 4 which form a primary-side bridge. On the other hand, rectification devices 7 and 8 are used on a secondary side of the transformer 9. Capacitors 13 to 16 are parasitic capacitances of the switching devices 1 to 4 respectively, and capacitors 17 and 18 are parasitic capacitances of the rectification devices 7 and 8.

In FIG. 9, the portion of a gate drive circuit for generating gate signals is not shown. The gate signals serve as driving signals for switching on/off the switching devices 1 to 4.

Here, in the period when the switching devices 1 and 4 are ON concurrently, a current flows in a path from a DC power supply 11 through the switching device 1, a coil 5, the transformer 9 and the switching device 4 back to the DC power supply 11 on the primary side of the transformer 9 so as to apply a positive voltage to a primary-side voltage Vt1 of the transformer. On the other hand, in the period when the switching devices 2 and 3 are ON concurrently, a current flows in a path from the DC power supply 11 through the switching device 3, the transformer 9, the coil 5 and the switching device 2 back to the DC power supply 11 so as to apply a negative voltage to the voltage Vt1.

In this manner, a positive or negative voltage is applied to the primary side of the transformer 9, and the voltage corresponding to the turn ratio of the transformer 9 is generated on the secondary side and rectified by the rectification devices 7 and 8 so as to output a DC voltage in an output voltage Vo.

In the configuration of FIG. 9, the coil 5 may be replaced by leakage inductance of the transformer 9.

FIG. 10 is a chart showing changes of the gate signals serving as driving signals of the switching devices 1 to 4 and the voltage value Vt1 on the primary side of the transformer 9 when the DC-DC converter in FIG. 9 is started up.

When the DC-DC converter is started up by phase shift operation as shown in FIG. 10, the driving signals of the switching devices 1 to 4 have a duty ratio of 50% to switch on/off the switching devices 1 and 2 alternatively and switch on/off the switching devices 3 and 4 alternatively. In addition, the gates signals of the switching devices 3 and 4 are shifted in phase from the gate signals of the switching devices 1 and 2. Incidentally, dead times are provided between the gate signals of the switching devices 1 and 2 and between the gate signals of the switching devices 3 and 4 respectively so as not to turn ON those switching devices 1 and 2 or 3 and 4 concurrently.

Here, a positive voltage is applied to the voltage Vt1 in the period when the switching devices 1 and 4 are ON concurrently, and a negative voltage is applied to the voltage Vt1 in the period when the switching devices 2 and 3 are ON concurrently. Accordingly, when the phases of the gate signals of the switching devices 3 and 4 with respect to those of the driving signals of the switching devices 1 and 2 are adjusted, the pulse width of the voltage value Vt1 is varied so that the magnitude of the secondary-side output voltage Vo can be adjusted.

When the DC-DC converter is started up, the period when the switching devices 1 and 4 are ON concurrently and the period when the switching devices 2 and 3 are ON concurrently are shortened as shown in FIG. 10. In this state, the phases of the gate signals of the switching devices 3 and 4 are changed gradually to increase the period when the switching devices 1 and 4 are ON concurrently and the period when the switching devices 2 and 3 are ON concurrently, as shown in FIG. 11. As a result, the value of the output voltage Vo is increased from zero to a target voltage.

[Patent Document 1] Japanese Unexamined Patent Application No. 2009-18302

As described in Japanese Patent Application No. 2009-18302, when the aforementioned phase shift operation is performed under no-load or light-load conditions set between output terminals 19a and 19b, a switching device in an arm of the primary-side full bridge is turned on immediately after a switching device in the opposite arm thereto is turned off. Thus, the switching device in the arm is turned on when the switching device in the opposite arm thereto is near a zero voltage. Therefore, reverse recovery of the switching device on the opposite arm may occur.

When, for example, the switching device 2 is turned on immediately after the switching device 1 is turned off, there is a possibility that the switching device 2 may be turned on in the state where the voltage of the switching device 1 is zero. Since the voltage of the switching device 1 is zero, a current easily flows into a body diode of the switching device 1. Since the switching device 2 is turned on in this state, reverse recovery of the body diode of the switching device 1 occurs. Typically, when the voltage-time change rate dv/dt at the reverse recovery of the body diode is beyond its maximum rated value, there is a fear that a MOSFET constituting the switching device is broken. Thus, occurrence of the reverse recovery increases loss and lowers the reliability of the apparatus remarkably. On the other hand, when the DC-DC converter is started up by PWM (Plus Width Modulation) operation, the duty ratio of each gate signal is lower than 50% as shown in FIG. 12. It is therefore possible to secure a long enough period in which the opposite switching devices in the upper and lower arms are OFF concurrently. Thus, sufficient time to increase a voltage can be secured after the switching devices are OFF. A current can be prevented from flowing into any body diode and therefore reverse recovery can be prevented from occurring.

However, to stabilize a forward bias voltage and a reverse bias voltage even if the duty ratio of an input voltage to a transformer is not about 50%, by use of a gate drive circuit which is possible to apply a reverse bias voltage between a gate and a source, the reverse bias voltage cannot be obtained if the pulse width in each gate signal is not wide enough.

When, for example, the DC-DC converter is started up, the switching devices 1 and 4 and the switching devices 2 and 3 must be driven by gate signals each having a narrow pulse. In the gate drive circuit at that time, however, a capacitor provided on the secondary side of the transformer is charged only in a period when the switching devices are ON. Thus, the capacitor cannot provide a sufficient reverse bias voltage Vr.

As a result, there is a fear that the switching devices 1 to 4 can be turned on due to induced noise from the outside, or the like, to thereby result in reduction of the reliability of the converter.

When the DC-DC converter is started up by gate signals each having a pulse width expanded in advance as shown in FIG. 13 in order to avoid the fear of switching devices 1 to 4 being turned on by induced noise, there is, however, another fear that the output voltage Vo may surpass the withstanding voltage of an apparatus connected thereto and therefore the apparatus may be broken. When, for example, the switching devices 1 and 4 are turned on concurrently, a positive voltage is applied to the voltage Vt1. Here, the voltages of the parasitic capacitances 17 and 18 are zero, and hence the voltage of each winding of the transformer 9 is also zero. Thus, the input voltage of the DC power supply 11 is applied to the coil 5 to suddenly increase the current flowing into the coil 5. Then, the energy stored in the coil 5 moves into the parasitic capacitance 18 due to the resonance operation between the coil 5 and the parasitic capacitance 18. As a result, the voltage of the parasitic capacitance 18 increases up to twice as large as the secondary-side voltage of the transformer 9. Then, the energy stored in the parasitic capacitance 18 moves into an output capacitor 12 through the secondary-side of the transformer 9 and a DC reactor 10. Thus, the output voltage Vo increases largely.

Typically there is no load when the DC-DC converter is started up. It is therefore impossible to discharge the energy stored in the output capacitor 12. Accordingly, when a switching operation is repeated on the switching devices 1 to 4 after the DC-DC converter is started up with the gate signals whose pulse widths are expanded as shown in FIG. 13, the output voltage Vo increases beyond the target voltage as shown in FIG. 14. As a result, secondary-side components of the DC-DC converter or an apparatus connected to the load may be broken.

In order to avoid this problem of high output voltages harming components, high-voltage components are typically used in the secondary-side components and the apparatus connected to the load, thereby causing increase in cost and loss.

SUMMARY OF THE INVENTION

In consideration of the aforementioned problems, an object of embodiments of the invention is to provide a method for starting up a DC-DC converter, by which an output voltage can be prevented from overshooting and body diodes of switching devices can be prevented from reverse recovery.

It is another object of embodiments of the invention to provide a method for starting up a DC-DC converter, by which switching devices can be prevented from malfunction caused by induced noise when the DC-DC converter is started up.

Embodiments of the invention provide a method for starting up a DC-DC converter so as to obtain a DC output, the DC-DC converter including a full bridge formed by a first series circuit and a second series circuit connected in parallel to a DC power supply, the first series circuit including a first switching device and a second switching device connected in series, the second series circuit including a third switching device and a fourth switching device connected in series, an internal connection point of the first series circuit being connected to one end of a primary side of a transformer, an internal connection point of the second series circuit being connected to the other end of the primary side of the transformer, a rectification device being connected to a secondary side of the transformer, the starting-up method including the steps of: turning on the first switching device with a first driving signal whose duty ratio is lower than 50%, turning on the second switching device with a second driving signal whose duty ratio is lower than 50% in a period when the first switching device is OFF, and driving the third switching device and the fourth switching device respectively with third and fourth driving signals whose duty ratios are lower than 50% and whose phases are shifted from the first and second driving signals of the first switching device and the second switching device; and increasing a shift quantity of the phases to increase an output voltage value of the DC output gradually.

According to embodiments of the invention, it is possible to start up the DC-DC converter while minimizing, or without causing, overshooting of the output voltage and without bringing reverse recovery into any body diode of the switching devices.

In addition, it is possible to clamp a driving voltage with a reverse bias when the switching devices are OFF at the starting-up time of the DC-DC converter. It is therefore possible to minimize or avoid malfunction due to the switching devices which are turned on by induced noise generated from the inside of the apparatus or another apparatus, etc. Thus, the DC-DC converter can be started up safely so that the reliability of the converter can be improved.

In addition, voltages applied to components at the starting-up time of the DC-DC converter can be reduced. Thus, low-withstanding voltage and low-loss components can be used to make the apparatus lower in loss and lower in cost.

DETAILED DESCRIPTION OF EMBODIMENTS OF THE INVENTION

Figure 9:
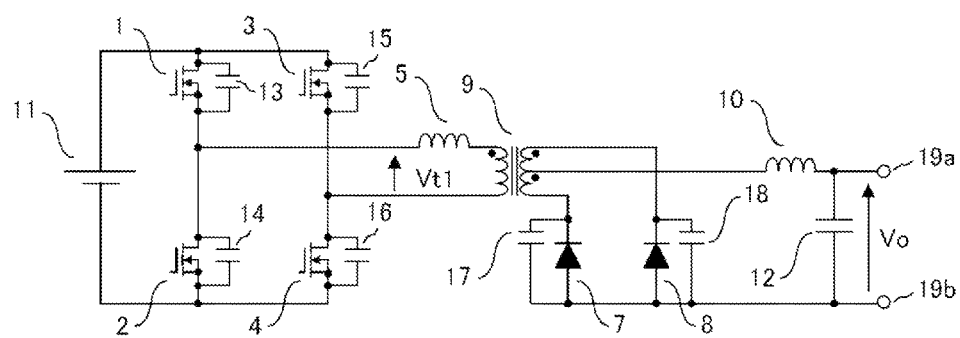
FIG. 9 is a diagram showing a configuration example of a DC-DC converter.
Figure 10:
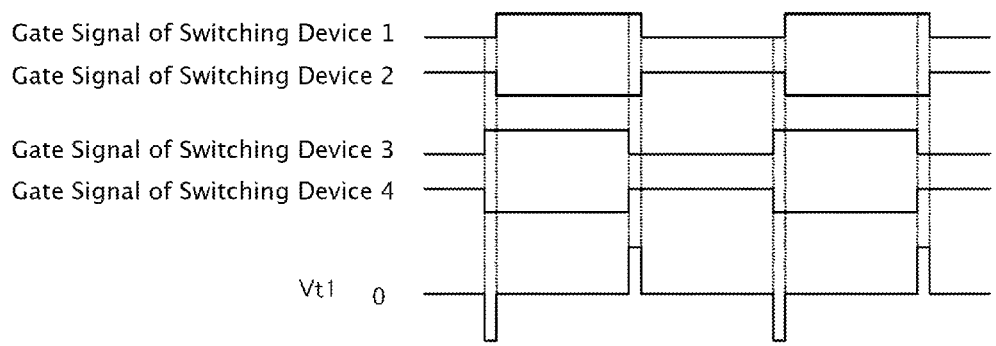
FIG. 10 is a chart showing changes of gate signals of switching devices and a voltage value Vt1 on a primary side of a transformer when the DC-DC converter in FIG. 9 is started up.
Figure 11:
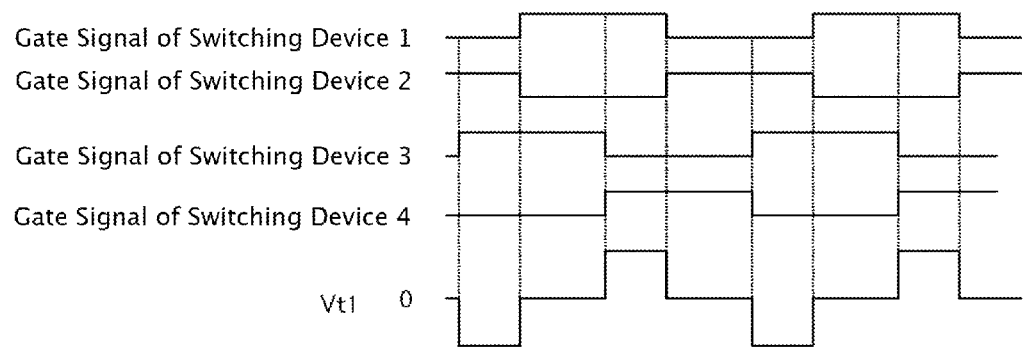
FIG. 11 is a chart showing the voltage value Vt1 on the primary side of the transformer when the phase difference between the gate signals is increased.
Figure 12:
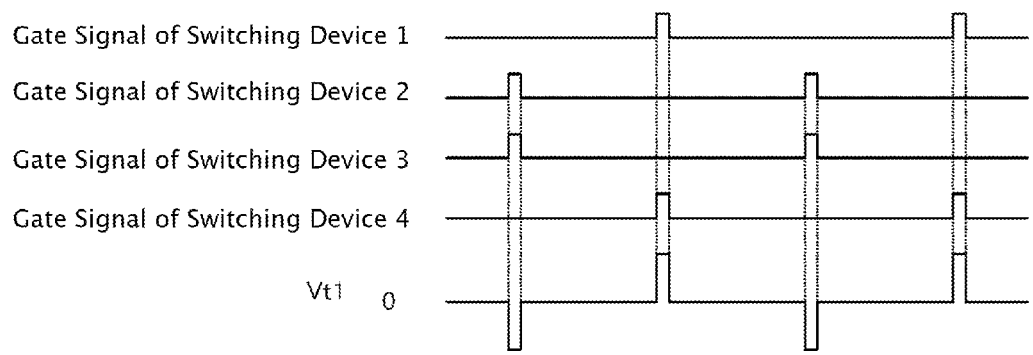
FIG. 12 is a chart showing changes of the gate signals of the switching devices and the voltage value Vt1 on the primary side of the transformer when the DC-DC converter in FIG. 9 is started up by PWM operation.
Figure 13:
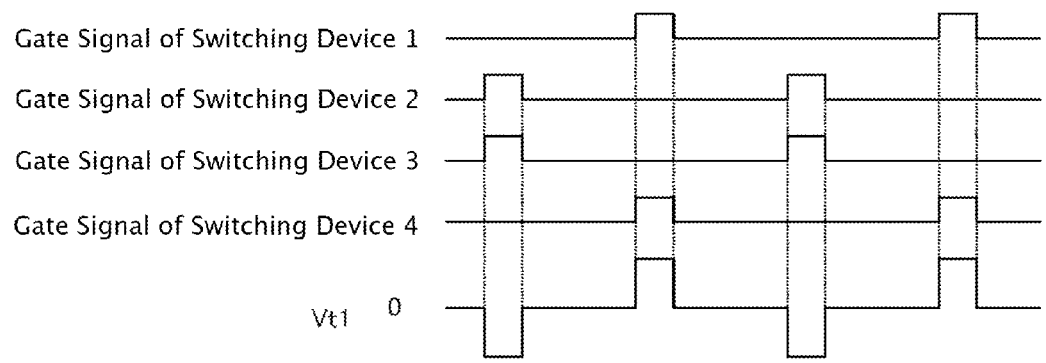
FIG. 13 is a chart showing the gate signals of the switching devices and the voltage value Vt1 on the primary side of the transformer when the width of the voltage value Vt1 is increased.
Figure 14:
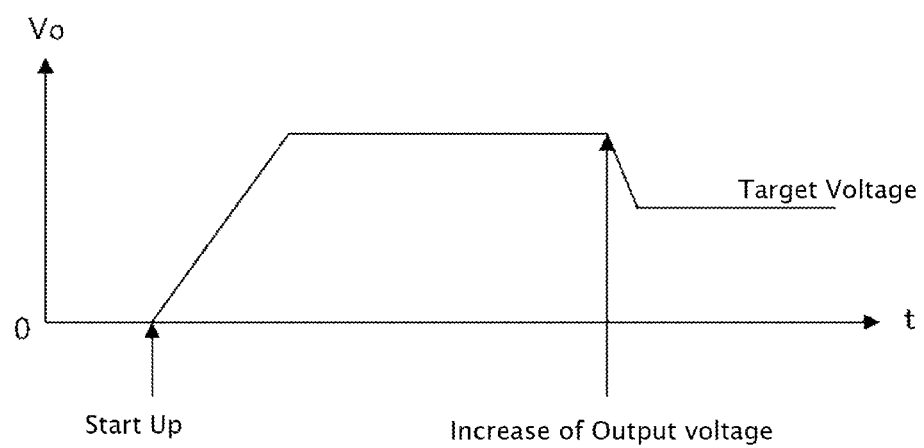
FIG. 14 is a chart showing a change of an output voltage Vo according to a background-art starting-up method.

A method for starting up a DC-DC converter according to each embodiment of the invention will described below with reference to the drawings. Description will be made below on the method for starting up a DC-DC converter according to each embodiment of the invention, in which the DC-DC converter has a configuration shown in FIG. 9. The DC-DC converter to which the method for starting up a DC-DC converter according to each embodiment of the invention is applied is not limited to the configuration of FIG. 9. Any other circuit may be used if the circuit has a configuration in which a full bridge constituted by switching devices is provided on a primary side of a transformer and an output of the transformer is rectified by a rectification circuit on a secondary side of the transformer to output a DC output.

A first embodiment of a method for starting up a DC-DC converter will be described.

Figure 1:
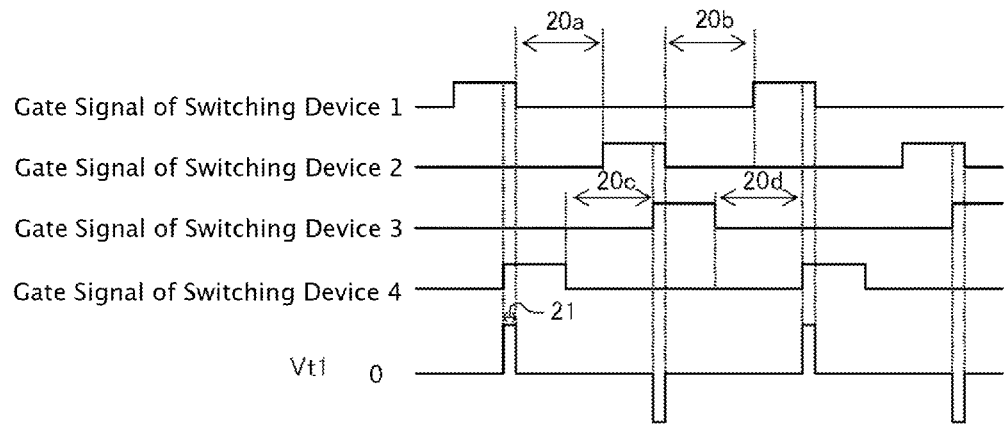
FIG. 1 is a chart for explaining a first embodiment of a method for starting up a DC-DC converter.

FIG. 1 is a chart for explaining the first embodiment of the method for starting up the DC-DC converter. FIG. 1 shows changes of gate signals applied to switching devices forming a bridge on a primary side of a transformer and a voltage value Vt1 on the primary side of the transformer when the DC-DC converter is started up.

First to fourth gate signals are applied to gates of switching devices 1 to 4 to switch on/off the switching devices respectively. Each of the switching devices 1 to 4 is turned ON when a gate signal applied thereto is H, and OFF when the gate signal is L.

The gate signal of the switching device 2 is turned on in the period when the gate signal of the switching device 1 is OFF. The gate signal of the switching device 4 is turned on in the period when the gate signal of the switching device 3 is OFF. Here is shown an example in which all the gate signals have equal pulse widths. However, the pulse widths may be different from one another.

Immediately after the DC-DC converter is started up, the gate signal of the switching device 1 has the same phase as the gate signal of the switching device 3, and the gate signal of the switching device 2 has the same phase as the gate signal of the switching device 4. Those gate signals are controlled to generate a phase difference gradually.

In FIG. 1, the duty ratio of each of the gate signals applied to the switching devices 1 to 4 is lower than 50%. Sufficiently long periods 20a to 20d when both the switching devices of the upper or lower arm are OFF concurrently are secured to secure enough time to increase the voltages of the switching devices after the switching devices are turned off.

Thus, there is no fear that a current flows into any body diode of the switching devices 1 to 4. It is therefore possible to operate each of the switching devices 1 to 4 without reverse recovery of the switching device in the opposite arm thereto.

Each gate signal is not set as a very narrow pulse at the starting-up time of the DC-DC converter. Each switching device is driven by a pulse width which is wide enough to charge a sufficient reverse bias voltage Vr in a capacitor provided on the secondary side of the transformer of the gate drive circuit in order to be capable of coping with the case where the gate drive circuit which applies the reverse bias voltage between the gate and the source is used. Thus, each switching device is clamped with the reverse bias voltage Vr applied between its gate and source during the period when the switching device is OFF. Thus, it is possible to reduce the possibility that the switching device may be turned on due to malfunction caused by induced noise from the inside of the apparatus or another apparatus etc.

In the starting-up method according to the first embodiment, the phase of each gate signal of the switching devices 3 and 4 is gradually shifted from that of each gate signal of the switching devices 1 and 2 in the state of FIG. 1 in order to increase the output voltage Vo gradually.

The period when the voltage Vt1 on the primary side of the transformer 9 is not zero corresponds to the period when the switching devices 1 and 4 are ON concurrently and the period when the switching devices 2 and 3 are ON concurrently. The phases of the switching devices 3 and 4 are shifted to increase those periods when the switching devices are ON concurrently, gradually from zero. Thus, the output voltage is increased gradually.

Figure 2:
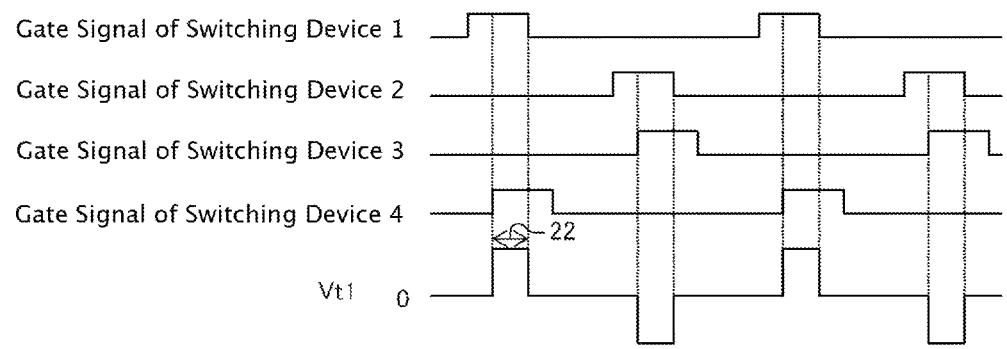
FIG. 2 is a chart showing a state where the phases of gate signals of switching devices 3 and 4 have been advanced in the state of FIG. 1.

FIG. 2 is a chart showing a state where the phases of the gate signals of the switching devices 3 and 4 have been advanced in the state of FIG. 1.

When the phase of each gate signal of the switching devices 3 and 4 is advanced relatively to the phase of each gate signal of the switching devices 1 and 2 in the state of FIG. 1, the pulse width of the voltage Vt1 increases from a pulse width 21 in FIG. 1 to a pulse width 22 as shown in FIG. 2. Thus, the pulse width of the voltage Vt1 can be increased gradually by gradual increase of the phase so that the output voltage Vo can be increased from 0 V to a target voltage without causing overshooting.

Next, a starting-up method according to a second embodiment will be described.

In the starting-up method according to the first embodiment, the phase of each gate signal of the switching devices 3 and 4 is shifted gradually as described above. Accordingly, when the phase has been shifted to make the phase of each gate signal of the switching devices 1 and 4 coincide with the phase of each gate signal of the switching devices 2 and 3, the output voltage Vo cannot be increased further. The starting-up method according to the second embodiment is to cope with this case.

According to the second embodiment, the phase of each gate signal of the switching devices 3 and 4 is shifted relatively to the phase of each gate signal of the switching devices 1 and 2 in the same manner as in the first embodiment, so as to increase the value of the voltage Vt1 gradually. As soon as the voltage Vt1 reaches a specific value, the phase shift operation is switched to PWM operation.

Figure 3:
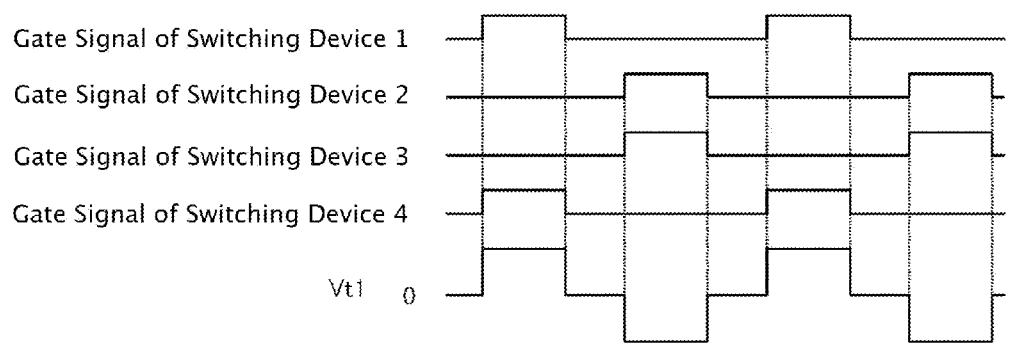
FIG. 3 is a chart showing each gate signal and a voltage value Vt1 during PWM operation in a second embodiment.

FIG. 3 is a chart showing each gate signal and the voltage Vt1 during the PWM operation in the second embodiment.

Figure 4:
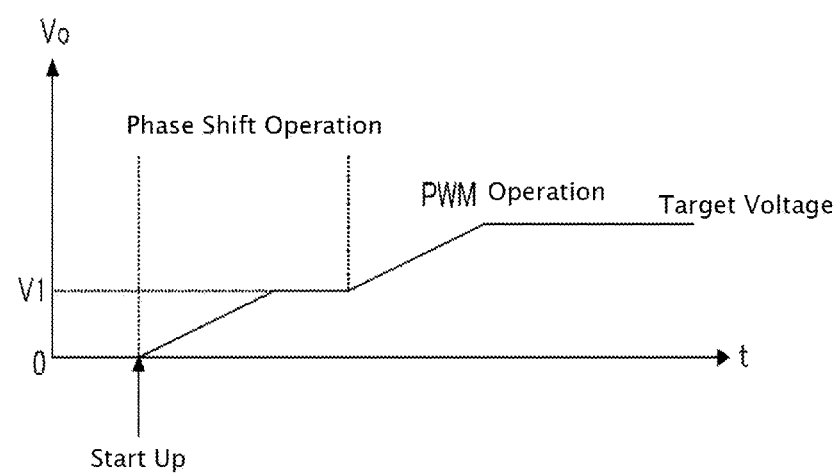
FIG. 4 is a chart showing a change of an output voltage Vo in a starting-up method according to the second embodiment.

In the phase shift operation, the phase is shifted to increase the pulse width of the voltage Vt1, generated on the primary side of the transformer 9, to the maximum. As soon as the phase is shifted thus so that the pulse width of the voltage Vt1 cannot be increased further, the pulse width of each gate signal of the switching devices 1 to 4 is expanded as shown in FIG. 4, while the circuit on the primary side of the transformer 9 then performs PWM operation. In this manner, the output voltage Vo can be increased to a higher value as shown in FIG. 4. Accordingly, a higher value than that in the starting-up method according to the first embodiment can be set as the target voltage of the output voltage Vo.

FIG. 4 is a chart showing a change of the output voltage Vo in the starting-up method according to the second embodiment.

At the starting-up time of the DC-DC converter, the output voltage Vo is initiated at 0 V and increased gradually by the phase shift of each gate signal. The pulse width of the voltage Vt1 on the primary side of the transformer 9 increases to the maximum, and the output voltage Vo reaches a maximum value V1 to which the output voltage Vo can be increased by the phase shift of each gate signal. Then, PWM operation for changing the pulse width of each gate signal is performed. Thus, the output voltage Vo is increased to a target voltage.

Next, a starting-up method according to a third embodiment will be described.

First, according to the third embodiment, the phases of the switching devices 3 and 4 are gradually shifted relative to the phases of the switching devices 1 and 2 so as to increase the output voltage Vo gradually in the same manner as in the first embodiment.

Figure 5:
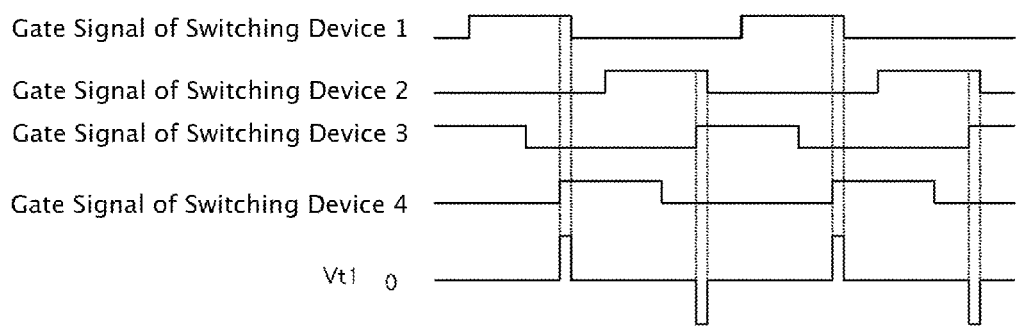
FIG. 5 is a chart (Part 1) for explaining a third embodiment.
Figure 6:
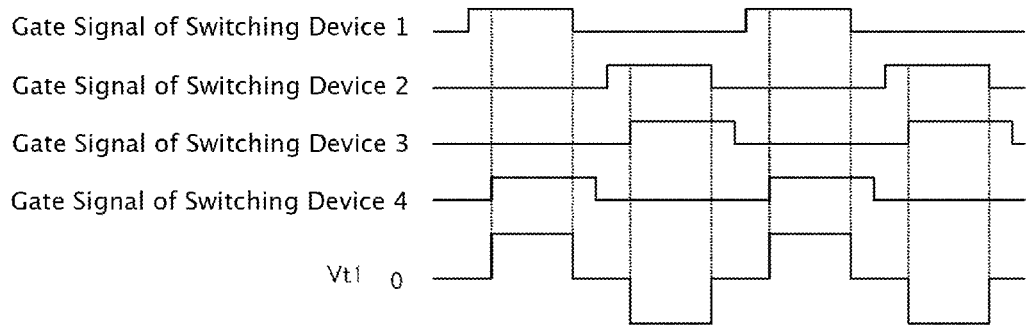
FIG. 6 is a chart (Part 2) for explaining the third embodiment.

Description will be made on the pulse width of each gate signal at this time. The DC-DC converter is started up with each driving signal whose pulse width is large enough to increase the output voltage Vo to the target voltage or higher in the phase shift operation as shown in FIG. 5. The phases of the gate signals of the switching devices 3 and 4 are shifted relatively to the phases of the gate signals of the switching devices 1 and 2 in the same manner as in the first embodiment. Thus, the pulse width of the voltage Vt1 on the primary side of the transformer 9 is increased gradually to increase the output voltage Vo as shown in FIG. 6. However, the pulse width of each gate signal at this time is set so that the duty ratio of the gate signal can be made lower than 50% so as to prevent any body diode of the switching devices 1 to 4 from reverse recovery.

Next, when the output voltage Vo rises to the target voltage, the switching devices 1 and 4 are driven only in the period when the switching devices 1 and 4 should be ON concurrently, and the switching devices 2 and 3 are driven only in the period when the switching devices 2 and 3 should be ON concurrently.

Figure 7:
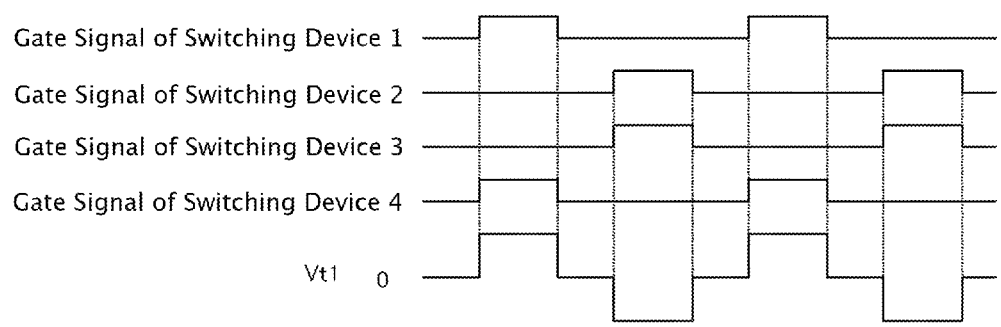
FIG. 7 is a chart (Part 3) for explaining the third embodiment.

FIG. 7 is a chart showing each gate signal and the voltage Vt1 on the primary side of the transformer 9 at that time.

As shown in FIG. 7, when the output voltage Vo reaches the target voltage, the gate signals of the switching devices 1 and 4 are updated with new gate signals which will be ON in the period when the switching devices 1 and 4 should be ON concurrently. At the same time, the gate signals of the switching devices 2 and 3 are updated with new gate signals which will be ON in the period when the switching devices 2 and 3 should be ON concurrently. After that, the switching devices 1 to 4 are driven by those new gate signals to perform PWM operation.

As a result, in the same manner as in the PWM operation disclosed in Japanese Patent Application No. 2009-166470, the pulse widths of the gate signals of the switching devices 1 to 4 are controlled to keep the output voltage Vo constant in spite of the fluctuation of a load between the output terminals 19a and 19b or the fluctuation of an input voltage supplied from the DC power supply 11.

Figure 8:
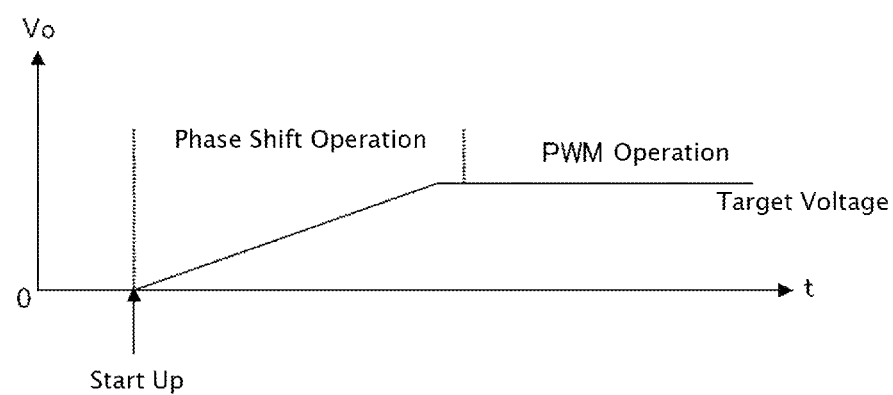
FIG. 8 is a chart showing a change of an output voltage Vo in a starting-up method according to the third embodiment.

FIG. 8 is a chart showing a change of the output voltage Vo in the starting-up method according to the third embodiment.

As shown in FIG. 8, in the starting-up method according to the third embodiment, phase shift operation is performed on gate signals in the same manner as in the first embodiment until the output voltage Vo reaches the target voltage.

When the output voltage Vo reaches the target voltage, the gate signals of the switching devices 1 and 4 are updated with signals whose levels are H in the period when the switching devices 1 and 4 are ON at that time. At the same time, the gate signals of the switching devices 2 and 3 are updated with signals whose levels are H in the period when the switching devices 2 and 3 are ON when the output voltage Vo reaches the target voltage. PWM operation is performed with the switching devices 1 to 4 actuated by those new gate signals so that the output voltage Vo can be kept constant and at the target voltage. In addition, the pulse widths of the gate signals can be adjusted to keep the output voltage Vo constant in spite of the fluctuation of a load or the fluctuation of an input voltage supplied from the DC power supply 11.

This application is based on, and claims priority to, Japanese Patent Application No. 2010-022077, filed on Feb. 3, 2010. The disclosure of the priority application, in its entirety, including the drawings, claims, and the specification thereof, is incorporated herein by reference.

What is claimed is:

1. A method for starting up a DC-DC converter so as to obtain a DC output, the DC-DC converter including a full bridge formed by a first series circuit and a second series circuit connected in parallel to a DC power supply, the first series circuit including a first switching device and a second switching device connected in series, the second series circuit including a third switching device and a fourth switching device connected in series, an internal connection point of the first series circuit being connected to one end of a primary side of a transformer, an internal connection point of the second series circuit being connected to the other end of the primary side of the transformer, a rectification device being connected to a secondary side of the transformer, the starting-up method comprising the steps of:
   turning on the first switching device with a first driving signal whose duty ratio is lower than 50%, turning on the second switching device with a second driving signal whose duty ratio is lower than 50% in a period when the first switching device is OFF, and driving the third switching device and the fourth switching device respectively with third and fourth driving signals whose duty ratios are lower than 50% and whose phases are shifted from the first and second driving signals, respectively, of the first switching device and the second switching device; and
   gradually increasing the amount that the third and fourth driving signals are shifted from the first and second driving signals, respectively, to increase an output voltage value of the DC output gradually.

2. A starting-up method according to claim 1, wherein when the output voltage value reaches a first value, the pulse widths of the first to fourth driving signals are increased to increase the output voltage value to a target value.

3. A starting-up method according to claim 1, wherein when the output voltage value reaches a target value, the first and fourth driving signals are updated with new signals which will be ON in a period when the first and fourth switching devices should be ON concurrently, and the second and third driving signals are updated with new signals which will be ON in a period when the second and third switching devices should be ON concurrently.

* * * * *